Feb. 23, 1926.
M. F. WEIDENBACH
AIR MOISTENING DEVICE
Filed Jan. 6, 1923
1,573,956
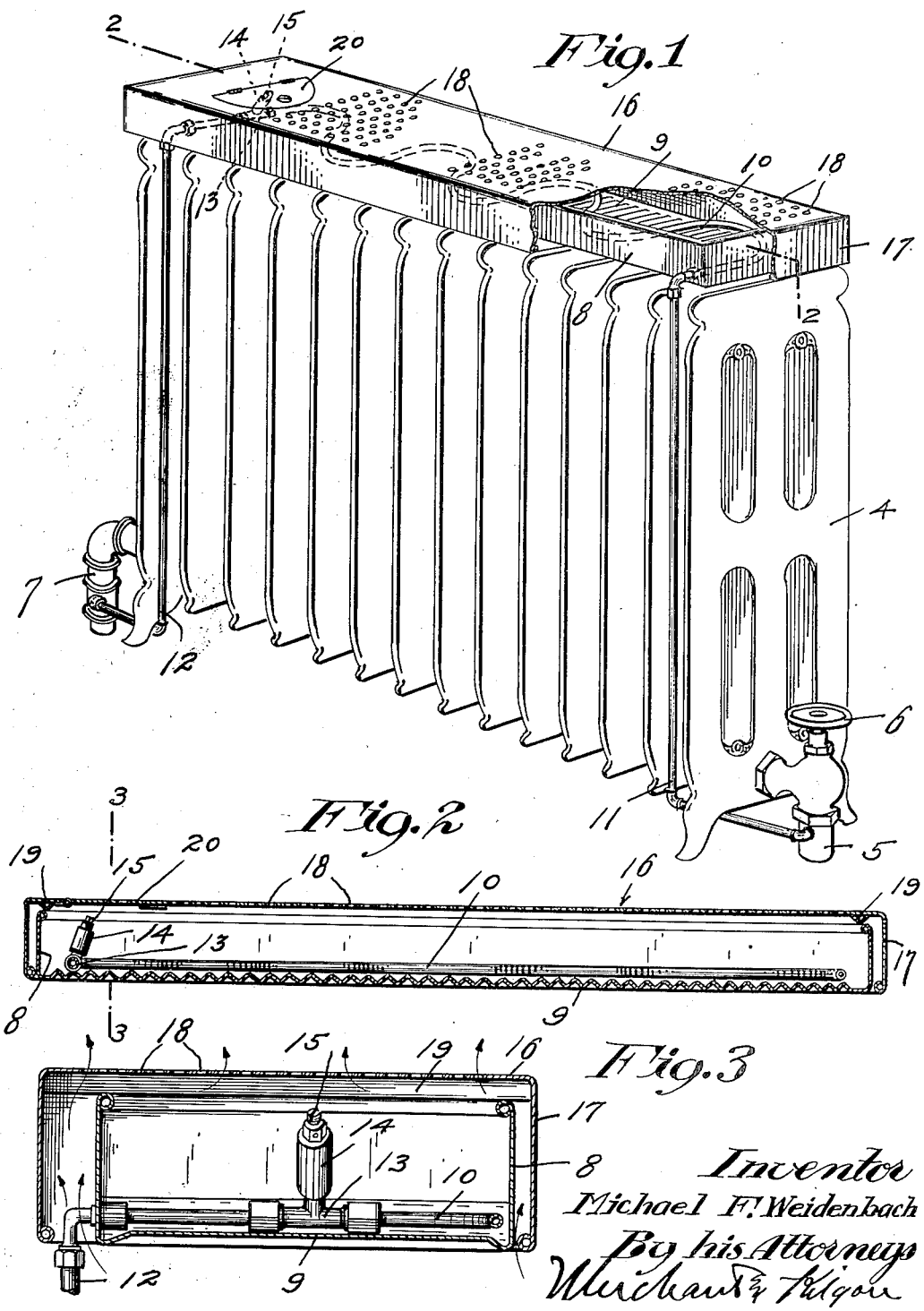

Patented Feb. 23, 1926.

1,573,956

UNITED STATES PATENT OFFICE.

MICHAEL F. WEIDENBACH, OF MINNEAPOLIS, MINNESOTA, ASSIGNOR TO NATIONAL AIR MOISTENER COMPANY, A CORPORATION OF MINNESOTA.

AIR-MOISTENING DEVICE.

Application filed January 6, 1923. Serial No. 611,030.

*To all whom it may concern:*

Be it known that I, MICHAEL F. WEIDENBACH, a citizen of the United States, residing at Minneapolis, in the county of Hennepin and State of Minnesota, have invented certain new and useful Improvements in Air-Moistening Devices; and I do hereby declare the following to be a full, clear, and exact description of the invention, such as will enable others skilled in the art to which it appertains to make and use the same.

My invention provides an extremely simple and highly efficient air-moistening device especially adapted for application to hot water and steam radiators, and to such ends, generally stated, the invention consists of the novel construction, combinations and arrangement of parts hereinafter described and defined in the claims. Medical experts and others familiar with the subject, have long recognized the fact that to keep the air at healthful and comfortable humidity in the average dwelling heated with hot water or steam, requires the daily evaporation of from ten to fifteen gallons of water. Few devices designed for this purpose will come anywhere near meeting this requirement. In practice, I have found that pans simply placed on radiators will not evaporate the water at the required rapidity and, hence, I have devised an evaporating pan which is designed to be placed on top of a radiator where it will receive direct heat therefrom by providing within the pan a heating pipe or coil arranged to receive hot water or steam from the circulating pipes of the heating system and thus affording means for heating water in the evaporating pan independently of the heat applied in the radiator. In carrying out these features, I incorporate in my air moistener various important features, which, acting co-operatively, produce an air moistener that will meet all of the requirements of residences, public offices, schools, public buildings, and elsewhere where hot water or steam radiators are used.

A commercial form of the improved air moistener is illustrated in the accompanying drawings, wherein like characters indicate like parts throughout the several views.

Referring to the drawings:

Fig. 1 is a perspective, with some parts broken away, showing one of my improved air moisteners applied to a radiator, which may be assumed to form a part of a hot water, steam or vapor heating system;

Fig. 2 is a vertical section taken through the air moistener on the line 2—2 of Fig. 1; and Fig. 3 is an enlarged transverse section taken approximately on the line 3—3 of Fig. 2.

For the purposes of illustration, it may be assumed that the radiator 4 shown in Fig. 1 is a vapor, water or steam radiator and receives its heating medium from a supply pipe 5 equipped with a controlling valve 6 and is connected to a return pipe 7, such being of the customary arrangement.

Placed on top of the radiator is a long preferably rectangular sheet metal evaporating pan 8, the bottom of which, for an important reason, is formed with transverse corrugations 9.

Within the pan 8 is a heating pipe or manifold 10 shown as bent in a horizontal plane to increase the length of the same within the pan. This heating pipe 10 rests on the corrugated bottom 9 and said corrugations permit a free circulation of water under and around said pipe. Here it may be stated that the pan 8 will be kept more or less completely filled with water, but preferably always to an altitude above said pipe. The receiving end of the heating pipe 10 is connected by a small pipe 11 to the pipe 5 at a point below the valve 6. The delivery end of said pipe 10 is connected to the return pipe 7 by a small pipe 12. Within the pan 8, the pipe 10, near its delivery end, is provided with a tubular coupling 13 having an upstanding valve casing 14 that is normally closed by an air venting valve 15, shown as of the needle valve type.

Over the open top of the pan 8 is placed a sheet metal cover 16 having a depending rectangular marginal flange 17 that encloses the pan 8 with considerable clearance on all four sides thereof, so as to provide passages for the free upward circulation of air, as indicated by arrows on Fig. 3. The top plate of the cover 16 is provided with numerous perforations 18 and, near its ends, it is provided with depending V-shaped ribs 19 that rest on the uper edge of the pan 8 so as to leave ample air passages between the upper edge of said pan and the top of said cover.

With the arrangement above described, it is evident that there will be a circulation of steam or hot water, as the case may be, through the heating pipe or manifold 10, not only when the valve 6 is opened but when said valve is closed and the heating medium is entirely cut off from the radiator. Thus, there can be maintained an evaporation of water even when the radiator is cold, but, of course, the evaporation will be more rapid when the radiator is hot and this is the result desired. Even when the radiator is cold, a very perceptible amount of heat will be carried into the water contained in the evaporating pan and such heat will be delivered into the room partly by the evaporation of the water and partly by direct radiation, so that the air moistener really operates as a small auxiliary heater. In very mild weather, the heat produced by the air moistener or air moisteners may be found sufficient to keep the room comfortable. In any event, the heat carried into the air moistener will not be wasted, but all will ultimately assist in heating the room. Moreover, the increased humidity produced by the evaporation of the water will make the room more comfortable at a low temperature, say sixty-eight degrees, than would be attained by the dry air at seventy-four or seventy-five degrees.

When first starting the air moistening device into action, there will be air in the heating pipe 10 and to permit the escape thereof from said pipe, the valve 15 will be temporarily opened. Said valve, as shown, has a slit head adapting it to be operated by a screwdriver, and to afford ready access to this valve, the cover 16, immediately over said valve, is provided with an opening that is normally closed by a hinged cover plate 20.

The described arrangement of the heating pipe 10 on the corrugated bottom 9 permits the freest kind of circulation of the water around said pipe and the described arrangement of the cover permits a very free circulation on all four sides of the evaporating pan and over the top thereof and thence up through the perforations of the cover 16. Of course, the higher the temperature of the water in the evaporating pan and the more rapid the circulation of air over the evaporating pan, the more rapid will be the evaporation of water into the air. Both of these conditions will be intensified when the heat is turned on to the radiator, but, as already noted, there is a heat-inducing and evaporating action in the air moistener itself that is independent of the action of the radiator. For this reason, the pipe 11 is tapped from the supply pipe 5 at a point below or beyond the radiator controlling valve 6, so that the heat can be turned onto or off from the radiator without turning off the air moistener.

The evaporating pan and cover may be made in different sizes or dimensions but will preferably be made in length corresponding to the length of the radiator to which it is to be applied. When applied to an ordinary radiator, this improved air moistener improves rather than mars the appearance thereof, for the reason that it gives to the radiator a sort of a finished cap, which, in practice, will usually be painted or decorated, the same as the radiator or in some manner that will harmonize or look well with the radiator decoration.

What I claim is:

1. An air moistening device comprising an evaporating pan having a transversely corrugated bottom and a removable perforated cover, and a water-heating pipe extended longitudinally within said pan, bent zigzag in a horizontal plane and resting on the crowns of the corrugations of said pan bottom.

2. An air moistening device comprising an evaporating pan adapted to rest upon a radiator, and a perforated cover for said pan having depending flanges spaced from the sides of said pan, said cover having on its under surface spacing ribs resting on the edge of said pan and holding the body of the cover above the pan to afford free circulation of air between the cover and edges of the pan and between the sides of the pan and the depending flanges of said cover.

In testimony whereof I affix my signature.

MICHAEL F. WEIDENBACH.